US011422541B2

(12) United States Patent
Chien

(10) Patent No.: US 11,422,541 B2
(45) Date of Patent: Aug. 23, 2022

(54) PRODUCTION MANAGEMENT METHOD AND SYSTEM

(71) Applicants: HKC Corporation Limited, Guangdong (CN); Chongqing HKC Optoelectronics Technology Co., Ltd., Chongqing (CN)

(72) Inventor: Chungkuang Chien, Chongqing (CN)

(73) Assignees: HKC Corporation Limited, Shenzhen (CN); Chongqing HKC Optoelectronics Technology Co., Ltd., Chongqing (CN)

(*) Notice: Subject to any disclaimer, the term of this patent is extended or adjusted under 35 U.S.C. 154(b) by 326 days.

(21) Appl. No.: 16/632,351

(22) PCT Filed: Jun. 22, 2018

(86) PCT No.: PCT/CN2018/092369
§ 371 (c)(1),
(2) Date: Jan. 19, 2020

(87) PCT Pub. No.: WO2019/024622
PCT Pub. Date: Feb. 7, 2019

(65) Prior Publication Data
US 2020/0233406 A1    Jul. 23, 2020

(30) Foreign Application Priority Data
Aug. 1, 2017    (CN) .......................... 201710649518.1

(51) Int. Cl.
*G05B 19/418* (2006.01)
*G06Q 10/06* (2012.01)

(52) U.S. Cl.
CPC . *G05B 19/41875* (2013.01); *G06Q 10/06395* (2013.01)

(58) Field of Classification Search
None
See application file for complete search history.

(56) References Cited

U.S. PATENT DOCUMENTS

2005/0075954 A1*  4/2005  Matsumoto .......... G06Q 10/087
                                                        705/28
2005/0256788 A1*  11/2005  Mukai ................ G06Q 10/0875
                                                        705/29
(Continued)

FOREIGN PATENT DOCUMENTS

CN    201828929 U    11/2011
CN    105700490 A     6/2016
(Continued)

OTHER PUBLICATIONS

Sundar et al., "A Review on Lean Manufacturing Implementation Techniques," Elsevier, 2014, 11 pg. (Year: 2014).*
(Continued)

*Primary Examiner* — Ryan D. Coyer

(57) ABSTRACT

Disclosed are a production management method and a production management system. The method includes: acquiring a first time data of a first type machine; filtering to obtain a production data of a first type product produced by the first type machine under the first time data based on a preset algorithm; searching to obtain a current distribution site of the first type product, according to the production data of the first type product; and withholding the first type product in the current distribution site.

16 Claims, 6 Drawing Sheets

(56) References Cited

U.S. PATENT DOCUMENTS

| | | | |
|---|---|---|---|
| 2007/0061226 A1* | 3/2007 | Ajiki | G06Q 10/083 |
| | | | 705/29 |
| 2007/0235465 A1* | 10/2007 | Walker | G07F 9/002 |
| | | | 221/9 |
| 2013/0024236 A1 | 1/2013 | Byatt | |
| 2016/0078396 A1* | 3/2016 | Kamioka | G05B 23/0297 |
| | | | 455/456.1 |
| 2018/0158020 A1* | 6/2018 | Khasis | G01C 21/343 |
| 2018/0253683 A1* | 9/2018 | Taylor | B65G 47/485 |
| 2019/0230832 A1* | 7/2019 | Ohashi | G06Q 10/0875 |
| 2019/0244421 A1* | 8/2019 | Houghton | G06T 7/66 |

FOREIGN PATENT DOCUMENTS

| | | | |
|---|---|---|---|
| CN | 106651103 A | | 5/2017 |
| CN | 106682708 A | | 5/2017 |
| JP | 2001273021 A | * | 10/2001 |

OTHER PUBLICATIONS

International Search Report of PCT Patent Application No. PCT/CN2018/092369 dated Oct. 8, 2018.

\* cited by examiner

PRODUCTION MANAGEMENT METHOD AND SYSTEM

FIELD

The present disclosure relates to the field of production processing technology, and more particularly relates to a production management method and a production management system.

BACKGROUND

For the current manufacturing plant of display panels, when an abnormal event occurs, for example when abnormal products are produced, all the abnormal products are needed to be withheld, to prevent a continuing circulation of the abnormal products. Now the common way to withhold the abnormal products is first to confirm the site where each abnormal product is currently located by worker, and then withhold the abnormal products. Obviously, in the common way, the process is complicated, lots of manpower resources consumed, and the abnormal products are prone to leak out due to man-made causes.

SUMMARY

It is one main objective of the present disclosure to provide a production management method, aiming to make the process of withholding a first type product simpler and more convenient, and manpower resource saved, as well as to reduce the adverse impact to the process of withholding the first type product due to man-made causes.

In order to realize the above objective, the present disclosure provides a production management method, the production management method includes following steps:

acquiring a first time data of a first type machine; filtering to obtain a production data of a first type product produced by the first type machine under the first time data based on a preset algorithm; searching to obtain a current distribution site of the first type product, according to the production data of the first type product; and withholding the first type product in the current distribution site.

In one embodiment of the present disclosure, before the step of acquiring a first time data of a first type machine, the production management method further includes: acquiring production information of product.

In one embodiment of the present disclosure, the production information includes: a serial number of the product, a barcode, a two-dimensional code, a production start time, a production stop time, a production site, a serial number of a production machine, a machine parameter, or a current distribution site.

In one embodiment of the present disclosure, the production information is monitored, recorded, and stored, to form a production information library with the production information of all of the products.

In one embodiment of the present disclosure, the step of acquiring a first time data of a first type machine includes: acquiring a serial number of an abnormal sampled product; matching to obtain a serial number of the first type machine that produces the abnormal sampled product and corresponding machine parameter, according to the serial number of the abnormal sampled product; and identifying the machine parameter of the first type machine, to obtain the first time data of the first type machine.

In one embodiment of the present disclosure, the preset algorithm includes: comparing whether a production start time of each product produced by the first type machine is larger than a start value of the first time data; and comparing whether a production stop time of the product is smaller than a stop value of the first time data.

In one embodiment of the present disclosure, the step of withholding the first type product in the current distribution site includes: acquiring a site capable to withhold product; comparing the current distribution site of the first type product with the site capable to withhold product; and withholding the first type product at the current distribution site, in response to a determination that the current distribution site of the first type product is included in the collection of the site capable to withhold product.

In one embodiment of the present disclosure, after the step of withholding the first type product in the current distribution site, the production management method further includes: transferring the first type product to a nearest site capable to withhold product to withhold the first type product, in response to a determination that the current distribution site of the first type product is not included in the collection of the site capable to withhold product.

In one embodiment of the present disclosure, the step of withholding the first type product in the current distribution site includes: classifying the production data of the first type products in the same current distribution site into one type, to obtain a production data list of the first type products in each current distribution site; and sending the production data lists of the first type products corresponding to different current distribution sites to the systems corresponding to the sites, to allow the corresponding systems to block all the first type products in the site thereof according to the production data of the first type products.

The present disclosure further provides a production management system. The production management system includes: a first acquiring module, configured to acquire a first time data of a first type machine; a filtering module, configured to filter to obtain a production data of a first type product produced by the first type machine under the first time data based on a preset algorithm; a searching module, configured to search to obtain a current distribution site of the first type product, according to the production data of the first type product; and a withholding module, configured to withhold the first type product in the current distribution site.

In one embodiment of the present disclosure, the first acquiring module is further configured to acquire production information of a product.

In one embodiment of the present disclosure, the production information includes: a serial number of the product, a barcode, a two-dimensional code, a production start time, a production stop time, a production site, a serial number of a production machine, a machine parameter, or a current distribution site.

In one embodiment of the present disclosure, the production information is monitored, recorded, and stored, to form a production information library with the production information of all of the products.

In one embodiment of the present disclosure, the first acquiring module includes: a first acquiring unit, configured to acquire a serial number of an abnormal sampled product; a matching unit, configured to match to obtain a serial number of the first type machine that produces the abnormal sampled product and corresponding machine parameter, according to the serial number of the abnormal sampled product; and an identifying unit, configured to identify the machine parameter of the first type machine, to obtain the first time data of the first type machine.

In one embodiment of the present disclosure, the preset algorithm includes: comparing whether a production start time of each product produced by the first type machine is larger than a start value of the first time data; and comparing whether a production stop time of the product is smaller than a stop value of the first time data.

In one embodiment of the present disclosure, when the two comparison results of the same product by the filtering module are both yes, the filtering module marks and feeds back the production data of the product.

In one embodiment of the present disclosure, the filtering module organizes, sorts the production data of all the products meeting a requirement, and saves or presents the production data in the form of a list.

In one embodiment of the present disclosure, the withholding module includes: a second acquiring unit, configured to acquire a site capable to withhold product; a comparing unit, configured to compare the current distribution site of the first type product with the site capable to withhold product; and a withholding unit, configured to withhold the first type product at the current distribution site, when the current distribution site of the first type product is included in the collection of the site capable to withhold product.

In one embodiment of the present disclosure, the withholding unit is further configured to configured to transfer the first type product to a nearest site capable to withhold product to withhold the first type product, when the current distribution site of the first type product is not included in the collection of the site capable to withhold product.

The present disclosure further provides a production management system. The production management system includes: a first acquiring module, configured to acquire a first time data of a first type machine; a filtering module, configured to filter to obtain a production data of a first type product produced by the first type machine under the first time data based on a preset algorithm; a searching module, configured to search to obtain a current distribution site of the first type product, according to the production data of the first type product; and a withholding module, configured to withhold the first type product in the current distribution site; the first acquiring module including: a first acquiring unit, configured to acquire the serial number of an abnormal sampled product; a matching unit, configured to match to obtain the serial number of the first type machine that produces the abnormal sampled product and corresponding machine parameter, according to the serial number of the abnormal sampled product; and an identifying unit, configured to identify the machine parameter of the first type machine, to obtain the first time data of the first type machine; the withholding module including: a second acquiring unit, configured to acquire a site capable to withhold product; a comparing unit, configured to compare the current distribution site of the first type product with the site capable to withhold product; and a withholding unit, configured to withhold the first type product at the current distribution site, when the current distribution site of the first type product is included in the collection of the site capable to withhold product.

In the present disclosure, the production management method is by acquiring a first time data of a first type machine, filtering to obtain a production data of a first type product produced by the first type machine under the first time data based on a preset algorithm, searching to obtain a current distribution site of the first type product, according to the production data of the first type product, and withholding the first type product in the current distribution site, so as to block all the first type products and prevent a continuing circulation, which effectively avoids the cumbersome process of confirming the site where each first type product is currently in and then withholding by worker, and saves lots of manpower resources, thereby making the process of withholding the first type products simpler and more convenient, and saving manpower resource, as well as reducing the adverse impact to the process of withholding the first type products due to man-made causes.

The realizing of the aim, functional characteristics and advantages of the present disclosure are further described in detail with reference to the accompanying drawings and the embodiments.

DETAILED DESCRIPTION OF THE EMBODIMENTS

It will be appreciated that the specific embodiments described herein are merely illustrative of the present disclosure and are not intended to limit the present disclosure.

The present disclosure provides a production management method, which is applied to a system.

Figure 1:
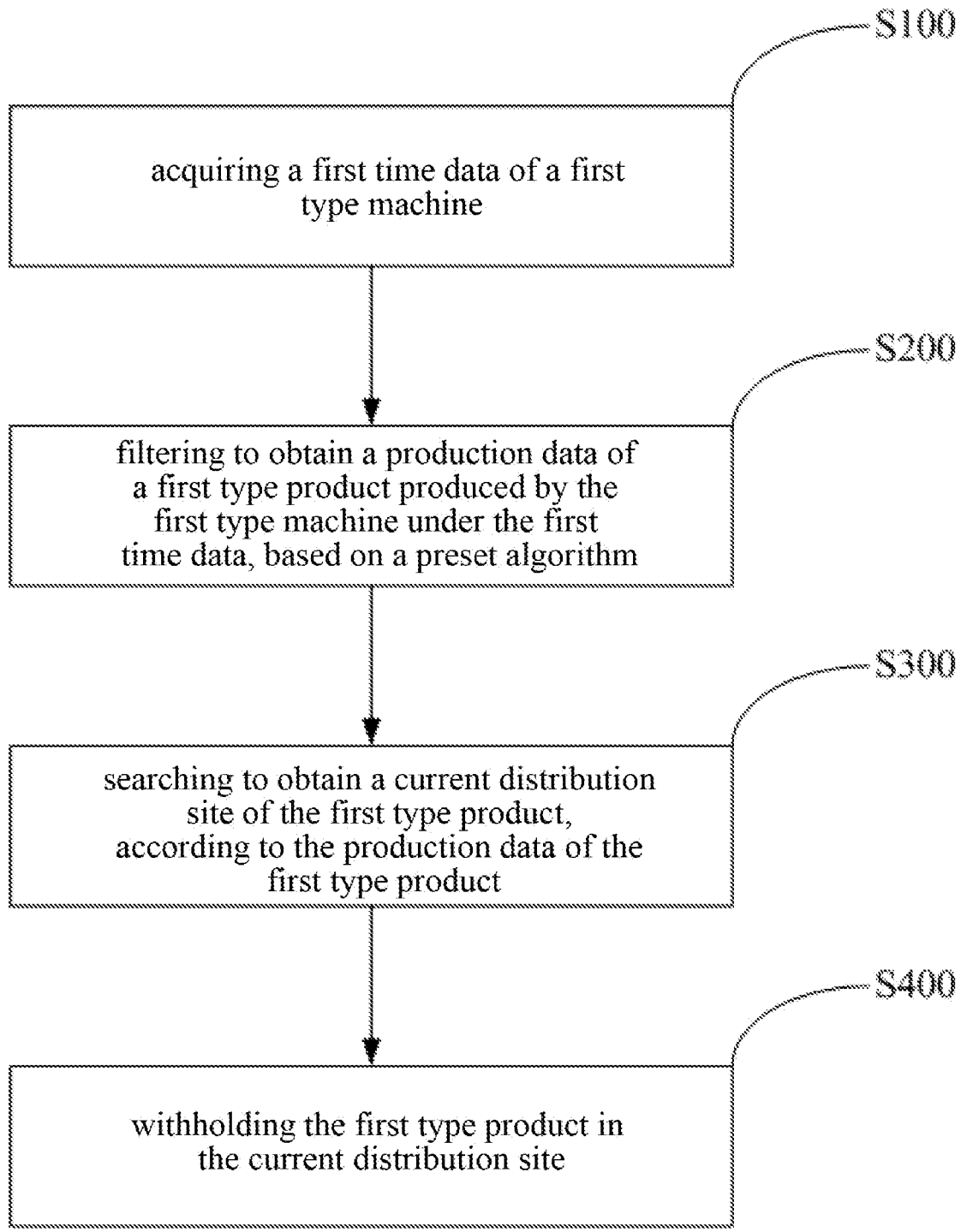
FIG. 1 is a flow diagram of the production management method of an embodiment according to the present disclosure.

Referring to FIG. 1, FIG. 1 is flow diagram of a production management method of an embodiment according to the present disclosure.

In this embodiment, the production management method includes:

S100, acquiring a first time data of a first type machine.

Specifically, for a machine producing products, when an abnormality occurs on the machine, it would directly affect the quality of the produced products, resulting in the production of a first type product (namely an abnormal product). Therefore, when the manufacture performs a random inspection on the products that it produced, and finds that there is the first type product in the sampled products, according to the production data of the first type product, the first type machine producing the first type product (namely the abnormal machine) and parameter information thereof are obtained by searching in production information of the products. Further, the machine parameter of the first type machine is identified, that is, the real-time operating parameter of the first type machine is compared with the standard operating parameter, to obtain a time interval in which the parameter is abnormal that the real-time operating parameter is not consistent with the standard operating parameter, that is, to obtain the first time data of the first type machine (namely the abnormal time interval).

It should be noted that, in actual production, the production information of every product (including: serial number of product, barcode, two-dimensional code, production start time, production stop time, production site, serial number of production machine, machine parameter, or current distribution site, and so on) is monitored, recorded, and stored, so that the production information of all of the products forms a systematic and orderly information library, namely a production information library, thereby facilitating the process of searching, filtering, comparing, matching, and so on. And it should be understood that, in actual production, the serial number of the machines having abnormality (namely the first type machine) may be one or more. In addition, the first type machine may be a machine that produces an abnormal product, or a machine that produces a product with a certain level of quality, or a machine that produces a product satisfying a certain requirement (good or bad); accordingly, the first type product is the product produced by the first type machine.

S200, filtering to obtain a production data of a first type product produced by the first type machine under the first time data based on a preset algorithm.

Specifically, the preset algorithm includes comparing whether the production start time of each product produced by the first type machine is larger than the start value of the first time data; and whether the production stop time of the product is smaller than the stop value of the first time data. If the two comparison results of the same product are both yes, the production data of the product is marked and fed back; the production data of all the products satisfying the requirement is organized, sorted, and saved or presented in the form of a list. It should be understood that, the production data of the first type product may include the serial number, the barcode, the two-dimensional code, and so on.

In addition, when an operator needs to know all of the first type products, the above list could be retrieved and viewed by a user interaction interface, or printed out for other processing.

S300, searching to obtain a current distribution site of the first type product, according to the production data of the first type product.

Specifically, after obtaining the production data of all of the first type products, further according to the production data, the current distribution sites of all of the first type products corresponding to the production data could be obtained by searching in the production information (namely the production information library). It should be understood that, in the production information (namely the production information library) of all the products, the production data and the current distribution sites of the products are saved, and the production data of the product is in correspondence with the current distribution site of the product, therefore, after the production data of the first type products is obtained, the current distribution sites of the first type products corresponding to the production data could be obtained by comparing the production data.

S400, withholding the first type product in the current distribution site.

Specifically, after obtaining the current distribution sites of all of the first type products, the production data of all of the first type products is classified according to the current distribution sites, that is, the production data of the first type products in the same current distribution site is classified into one type, to obtain a production data list of the first type products in each current distribution site; then, the production data lists of the first type products corresponding to different current distribution sites are sent to systems of the corresponding sites, to allow the systems of the corresponding sites to block all the first type products in the sites thereof according to the production data of the first type products, preventing a continuing circulation from the first type products being transported or sold out. That is to say, after the production site receives the corresponding production data list of the first type products, all the first type products in the production site involved in the list are blocked, and not allowed to be transported or sold, thereby preventing the circulation of the first type products.

In the technical solution of the present disclosure, the production management method is by acquiring a first time data of a first type machine, and filtering to obtain production data of the first type product produced by the first type machine under the first time data, based on a preset algorithm, then searching to obtain a current distribution site of the first type product, according to the production data of the first type product, finally withholding the first type product in the current distribution site, so as to block all the first type products and prevent the circulation, which effectively avoids the cumbersome process of confirming the site where each first type product is currently in and then withholding by worker, and saves lots of manpower resources, thereby making the process of withholding the first type product simpler and more convenient, and saving manpower resource, as well as reducing the adverse impact to the process of withholding the first type product due to man-made causes.

In addition, it should be noted that, the production management method is not only applied to production management of display panels, but also to production management of other suitable products.

Figure 2:
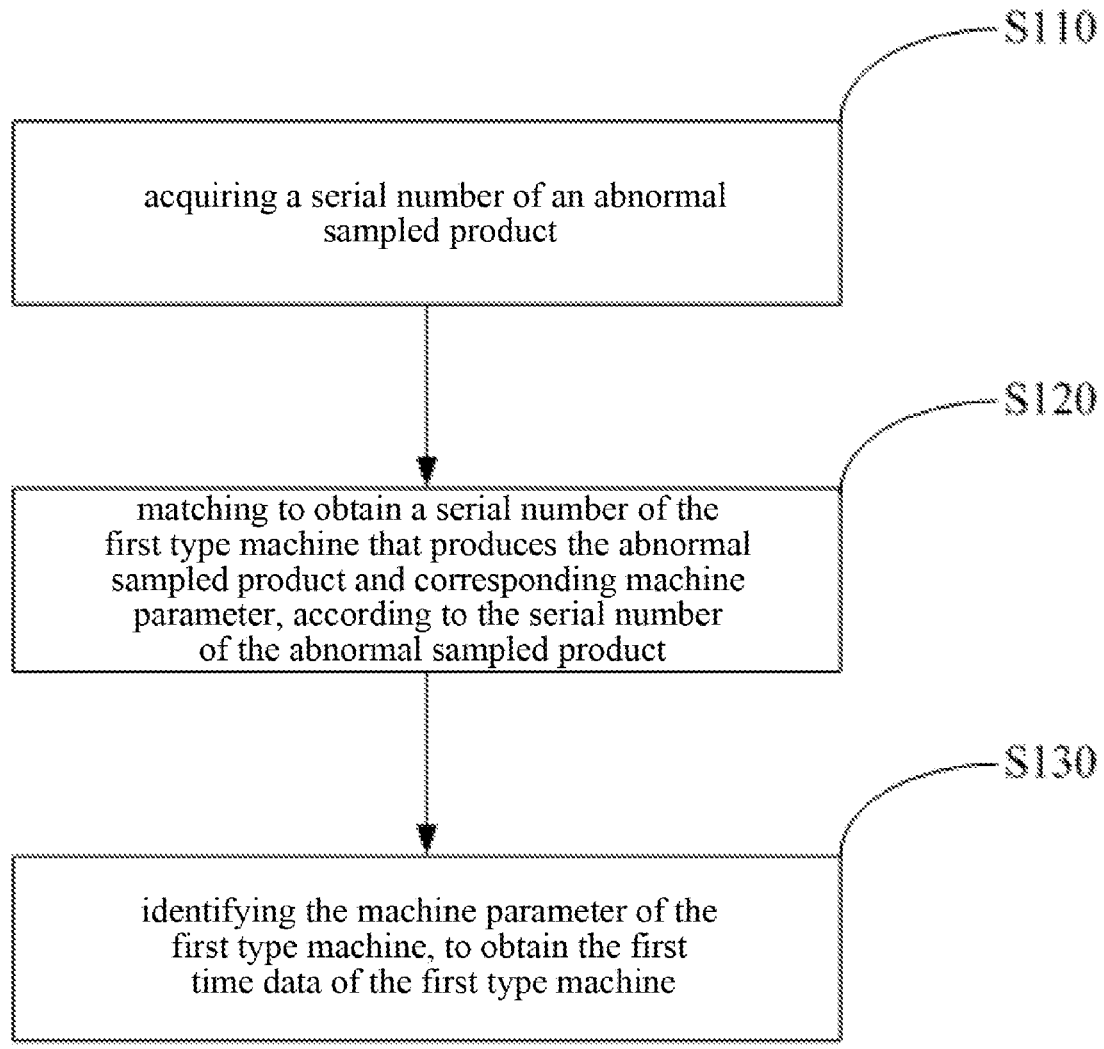
FIG. 2 is a detailed flow diagram of the step of the acquiring first time data of a first type machine as shown in FIG. 1.

Referring to FIG. 2, FIG. 2 is a detailed flow diagram of the step of the acquiring a first time data of a first type machine as shown in FIG. 1, in this embodiment, the step S100 includes:

S110, acquiring the serial number of an abnormal sampled product.

Specifically, for a machine that produces products, when an abnormality occurs on the machine, it would directly affect the quality of the produced products, resulting in the production of the first type product. Therefore, in order to guarantee the quality of the products, the manufacturer would conduct a random inspection on the produced products regularly or irregularly. When the first type product is detected among the sampled products, namely when the abnormal sampled product is detected, the serial number of the abnormal sampled product is acquired.

S120, matching to obtain the serial number of the first type machine that produces the abnormal sampled product and corresponding machine parameter, according to the serial number of the abnormal sampled product.

Specifically, when the manufacture performs a random inspection on the products that it produced, and finds that there is the first type product in the sampled products, that is, when the abnormal sampled product is detected, according to the serial number of the abnormal sampled product, the serial number of the first type machine producing the abnormal sampled product which is matched with the serial number of the abnormal sampled product, and corresponding machine parameter are obtained, by searching in the production information of all the products (namely the production information library).

S130, identifying the machine parameter of the first type machine, to obtain the first time data of the first type machine.

Specifically, after obtaining the serial number of the first type machine producing the abnormal sampled product and the corresponding machine parameter, it's to identify the machine parameter, that is, the real-time operating parameter of the first type machine is compared with the standard operating parameter, to obtain a time interval in which the parameter is abnormal that the real-time operating parameter is not consistent with the standard operating parameter, that is, to obtain the first time data of the first type machine.

It should be understood that, the standard operating parameter may be a parameter change interval. When the actual operating parameter fails to fall within the parameter change interval, the real-time operating parameter is not consistent with the standard operating parameter.

In the technical solution of the present disclosure, the process of manual matching and identification is converted into the process of system matching and identification during the process of obtaining the first time data of the first type machine, which not only saves the cost of manpower resources, effectively improves the efficiency of the matching and identification process, but also reduces the adverse impact to the process of withholding the first type product due to man-made causes, so that the withholding process of the first type products is further simplified and facilitated.

Figure 3:
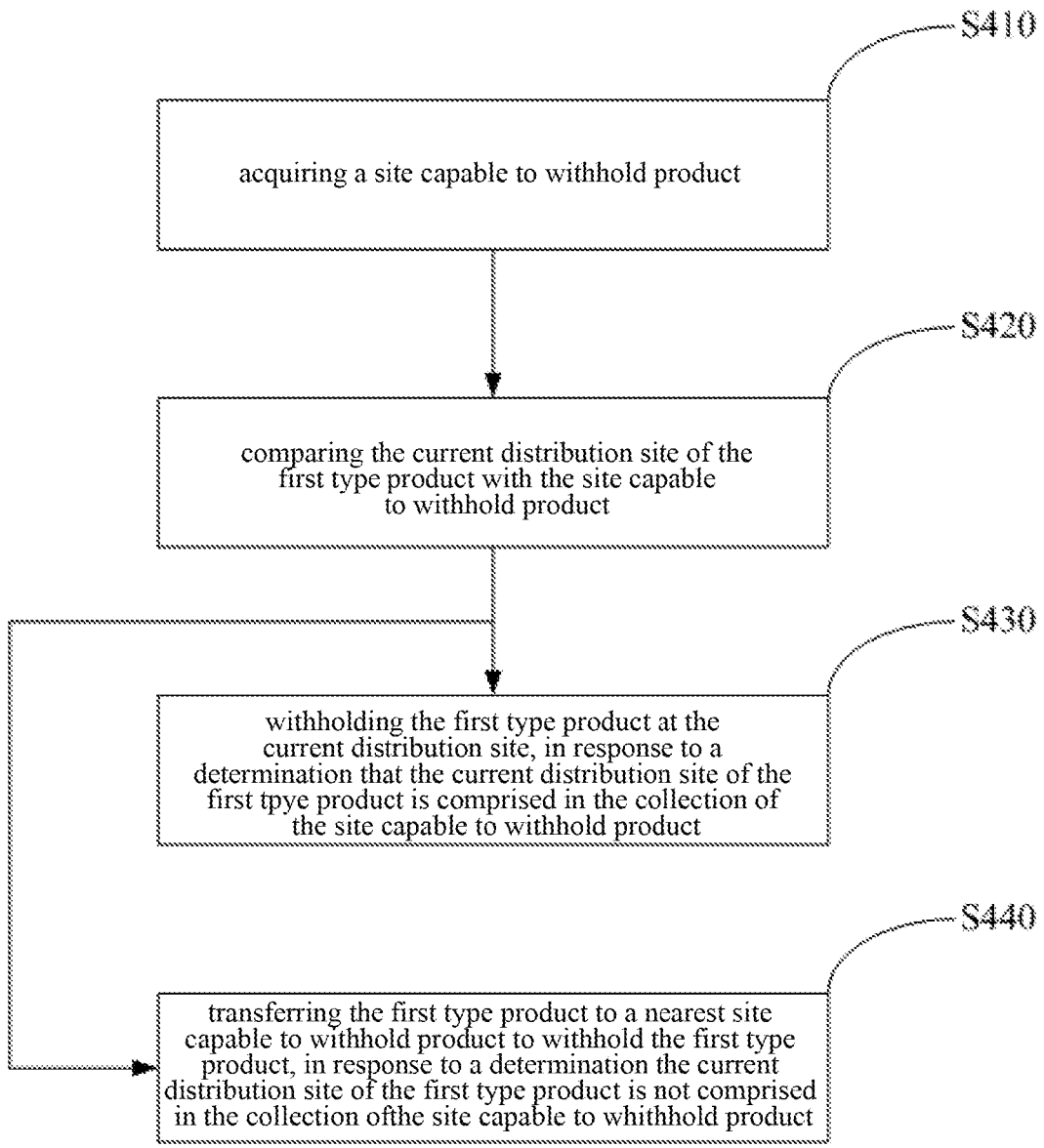
FIG. 3 is a detailed flow diagram of the step of the withholding the first type product in the current distribution site as shown in FIG. 1.

Referring to FIG. 3, FIG. 3 is a detailed flow diagram of the step of the withholding the first type product in the current distribution site, in this embodiment, the Step S400 includes:

S410, acquiring a site capable to withhold product;

S420, comparing the current distribution site of the first type product with the site capable to withhold product;

S430, withholding the first type product at the current distribution site, when the current distribution site of the first type product is included in the collection of the site capable to withhold product; and S440, transferring the first type product to a nearest site capable to withhold product to withhold the first type product, when the current distribution site of the first type product is not included in the collection of the site capable to withhold product.

It should be understood that, in the actual withholding process, due to various reasons, such as: personnel, vehicles, road conditions, transportation conditions, and so on, not every current distribution site could directly perform withholding process. For this case, after obtaining the current distribution site of the first type product, the site capable to withhold product input by the operator could be obtained through the user interaction interface.

And after obtaining the sites capable to withhold product, the current distribution sites of the first type products are compared with the sites capable to withhold product. For this case, there are two site types in the current distribution sites, one site type exists in the sites capable to withhold product (namely, the current distribution site which is included in the collection of the sites capable to withhold product), and the other site type does not exist in the sites capable to withhold product (namely, the current distribution site which is not included in the collection of the sites capable to withhold product).

For the current distribution sites which exist in the sites capable to withhold product, the first type products in these sites could be directly withheld. And for the current distribution sites which do not exist in the sites capable to withhold product, the first type products in these sites could be transferred or postponed to the nearest site capable to withhold product to withhold the first type products.

For example, the current distribution sites of the first type products are A, C and E; the sites capable to withhold product are A, C and F.

For site A in the current distribution sites, it is included in the collection of the sites capable to withhold product, the first type products in the site A are directly withheld at the site A;

for site C in the current distribution sites, it is also included in the collection of the sites capable to withhold product, the first type products in the site C are directly withheld at the site C;

for site E in the current distribution sites, it is not included in the collection of the sites capable to withhold product, the first type products in the site E are transferred or postponed to the site capable to withhold product F for withholding.

In this way, it is possible to intelligently perform the withholding process according to the actual situation, which not only effectively improves the efficiency of the withholding process, but also effectively guarantees the timeliness of the withholding process.

Figure 4:
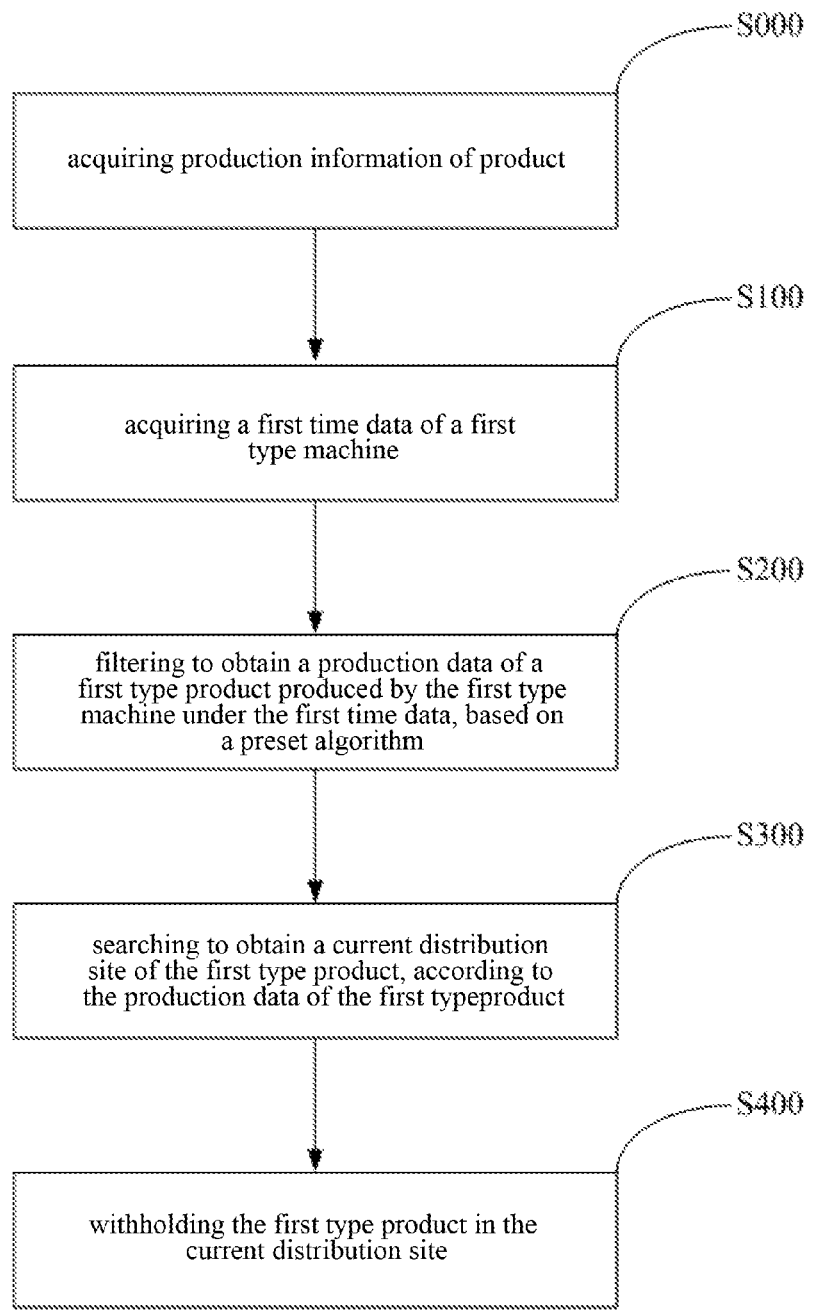
FIG. 4 is a flow diagram of the production management method of another embodiment according to the present disclosure.

The present disclosure provides another embodiment of the production management method based on the above embodiments. Referring to FIG. 4, in this embodiment, before S100, further includes:

S000, acquiring production information of product.

It should be noted that, in actual production, the production information of every product (including: serial number of product, barcode, two-dimensional code, production start time, production stop time, production site, serial number of production machine, machine parameter, or current distribution site, and so on) is monitored, recorded, and stored, so that the production information of all of the products forms a systematic and orderly information library, namely the production information library, thereby facilitating the process of searching, filtering, comparing, matching, and so on.

The following is a description of the above production management method taking the display panel as an example. The production management method is applied to a production management system. Specifically:

When a random inspection is performed on the display panels during the production process, and an abnormal product is detected in the sampled display panels, the production management system acquires the serial number of the abnormal display panel (specifically, acquiring the serial number input by the manufacturer through the user interaction interface, or acquiring the serial number by scanning the two-dimensional code or the barcode), and the production management system, according to the serial number of the abnormal display panel, acquires the relevant machine producing the abnormal display panel and the parameter information thereof by matching in the production information library. In some embodiments, the abnormal display panel is a defective product that appears in the process. And the parameter information of the relevant machine is identified: comparing the real-time operating parameter of the relevant machine with the corresponding standard operating parameter, to obtain a time interval in which the parameter is abnormal that the real-time operating parameter is not consistent with the standard operating parameter, namely the abnormal time interval of the relevant machine.

Next, the production management system, according to the abnormal time interval of the relevant machine, filters to obtain the serial numbers of all the abnormal display panels produced by the relevant machine during the corresponding abnormal time interval in the production information library. Then, according to the serial numbers of all the abnormal display panels, the current distribution sites of all the abnormal display panels are obtained by searching in the production information library.

Finally, the production management system, according to the current distribution sites of all the abnormal display panels, withholds all the abnormal display panels in the corresponding sites: blocking all the abnormal display panels, not allowing this part of the display panels to be transported or sold, so as to prevent the circulation of the abnormal display panels.

Additionally, it should be understood that, the standard operating parameter of the machine is generally in a range. When the real-time operating parameter of the machine falls within the range, the machine may produce qualified products; when the real-time operating parameter of the machine is below the range, the machine may produce unqualified products. And when the real-time operating parameter of the machine is above the range, the machine may produce higher quality products. Therefore, the comparison of the real-time operating parameter of the machine with a higher range, could become an acquisition condition of the numbers of higher quality products, so as to find this part of the higher quality products.

Additionally, the production management method according to the present disclosure is also applied to the production process of LCD (Liquid Crystal Display) display panels, OLED (Organic Light Emitting Diode) display panels, QLED (Quantum Dot Light Emitting Diodes) display panels, curved surface display panels and other display panels, making the withholding process of the first type products (namely the qualified products) simpler and more convenient, saving human resource costs, and reducing the adverse effects of human problems on the withholding process of the first type products (namely the qualified products).

Figure 5:
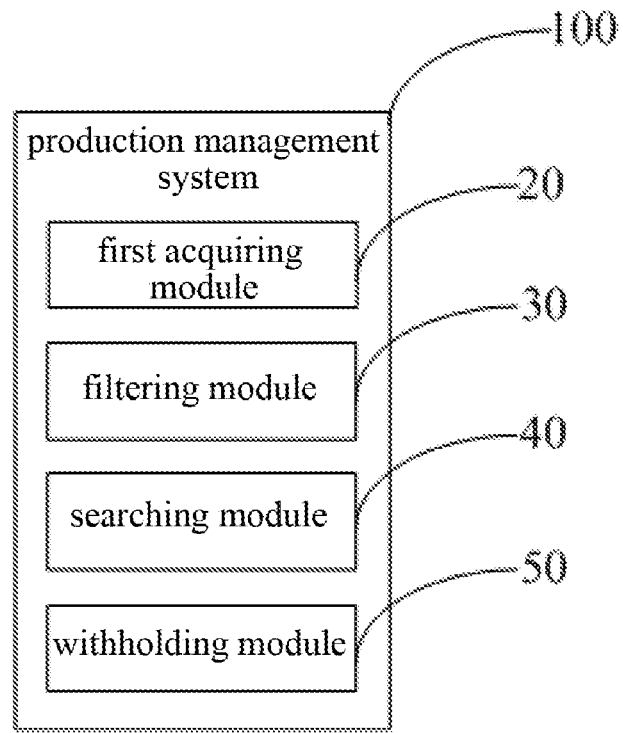
FIG. 5 is a block diagram of the production management system of an embodiment according to the present disclosure.

The present disclosure further provides a production management system 100, the above production management method is applied to the system. Referring to FIG. 5, FIG. 5 is a block diagram of the production management system of an embodiment according to the present disclosure.

In this embodiment, the production management system 100 includes:

A first acquiring module 20, configured to acquire a first time data of a first type machine.

Specifically, for a machine producing products, when an abnormality occurs on the machine, it would directly affect the quality of the produced products, resulting in the production of a first type product (namely an abnormal product). Therefore, when the manufacture performs a random inspection on the products that it produced, and finds that there is the first type product in the sampled products, the first acquiring module 20, according to the production data of the first type product, obtains the first type machine producing the first type product (namely the abnormal machine) and parameter information thereof by searching in production information of the products. Further, first acquiring module 20 identifies the machine parameter of the first type machine, that is, the real-time operating parameter of the first type machine is compared with the standard operating parameter, to obtain a time interval in which the parameter is abnormal that the real-time operating parameter is not consistent with the standard operating parameter, that is, to obtain the first time data of the first type machine (namely the abnormal time interval).

It should be noted that, in actual production, the production information of every product (including: serial number of product, barcode, two-dimensional code, production start time, production stop time, production site, serial number of production machine, machine parameter, or current distribution site, and so on) is monitored, recorded, and stored, so that the production information of all of the products forms a systematic and orderly information library, namely a production information library, thereby facilitating the process of searching, filtering, comparing, matching, and so on. And it should be understood that, in actual production, the number of the machines having abnormality (namely the first type machine) may be one or more. In addition, the first type machine may be a machine that produces an abnormal product, or a machine that produces a product with a certain level of quality, or a machine that produces a product satisfying a certain requirement (good or bad); accordingly, the first type product is the product produced by the first type machine.

A filtering module 30, configured to filter to obtain a production data of a first type product produced by the first type machine under the first time data based on a preset algorithm.

Specifically, the preset algorithm includes comparing whether the production start time of each product produced by the first type machine is larger than the start value of the first time data; and whether the production stop time of the product is smaller than the stop value of the first time data. If the two comparison results of the same product by the filtering module 30 are both yes, the filtering module 30 marks and feeds back the production data of the product, and the filtering module 30 organizes, sorts the production data of all the products satisfying the requirement, and saves or presents in the form of a list. It should be understood that, the production data of the first type product may include the serial number, the barcode, the two-dimensional code, and so on.

In addition, when an operator needs to know all of the first type products, the above list could be retrieved and viewed by a user interaction interface, or printed out for other processing.

A searching module 40, configured to search to obtain a current distribution site of the first type product, according to the production data of the first type product.

Specifically, after the filtering module 30 obtains the production data of all of the first type products, the searching module 40 further according to the production data, obtains the current distribution sites of all of the first type products corresponding to the production data could by searching in the production information (namely the production information library). It should be understood that, in the production information (namely the production information library) of all the products, the production data and the current distribution sites of the products are saved, and the production data of the product is in correspondence with the current distribution site of the product, therefore, after the filtering module 30 obtains the production data of the first type products, the searching module obtains the current distribution sites of the first type products corresponding to the production data by comparing the production data.

A withholding module 50, configured to withhold the first type product in the current distribution site.

Specifically, after the searching module 40 obtains the current distribution sites of all of the first type products, the withholding module 50 classifies the production data of all of the first type products according to the current distribution sites, that is, the production data of the first type products in the same current distribution site is classified into one type, to obtain a production data list of the first type products in each current distribution site; then, the withholding module 50 sends the production data lists of the first type products corresponding to different current distribution sites to systems of the corresponding sites, to allow the systems of the corresponding sites to block all the first type products in the sites thereof according to the production data of the first type products, preventing the circulation from the first type products being transported or sold out. That is to say, after the production site receives the corresponding production data list of the first type products, all the first type products in the production site involved in the list are blocked, and not allowed to be transported or sold, thereby preventing the circulation of the first type products.

In the technical solution of the present disclosure, the production management system 100 is by acquiring the first time data of the first type machine, and filtering to obtain production data of the first type product produced by the first type machine under the first time data based on a preset algorithm, then searching to obtain a current distribution site of the first type product, according to the production data of the first type product, finally withholding the first type product in the current distribution site, so as to allow all the first type products to be blocked and the circulation to be terminated, which effectively avoids the cumbersome process of confirming the site where each first type product is currently in and then withholding by worker, and saves lots of manpower resources, thereby making the process of withholding the first type product simpler and more convenient, and saving manpower resource, as well as reducing the adverse impact to the process of withholding the first type product due to man-made causes.

In addition, it should be noted that, the production management method is not only applied to production management of display panels, but also to production management of other suitable products.

Figure 6:
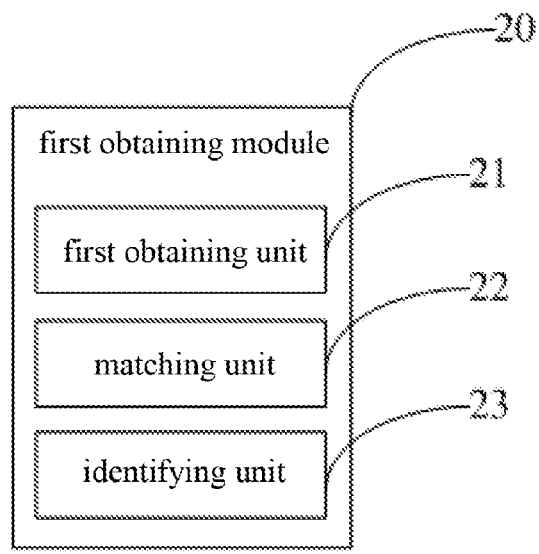
FIG. 6 is a block diagram of the first acquiring module as shown in FIG. 5.

Referring to FIG. 6, FIG. 6 is a block diagram of the first acquiring module, in this embodiment, the first acquiring module 20 includes:

A first acquiring unit 21, configured to acquire the serial number of an abnormal sampled product.

Specifically, for a machine that produces products, when an abnormality occurs on the machine, it would directly affect the quality of the produced products, resulting in the production of the first type product. Therefore, in order to guarantee the quality of the products, the manufacturer would conduct a random inspection on the produced products regularly or irregularly. When the first type product is detected among the sampled products, namely when the abnormal sampled product is detected, the first acquiring unit 21 acquires the serial number of the abnormal sampled product.

A matching unit 22, configured to match to obtain the serial number of the first type machine that produces the abnormal sampled product and corresponding machine parameter, according to the serial number of the abnormal sampled product.

Specifically, when the manufacture performs a random inspection on the products that it produced, and finds that there is the first type product in the sampled products, that is, when the abnormal sampled product is detected, the matching unit 22, according to the serial number of the abnormal sampled product, obtains the serial number of the first type machine producing the abnormal sampled product which is matched with the serial number of the abnormal sampled product, and the corresponding machine parameter, by searching in the production information of all the products (namely the production information library).

An identifying unit 23, configured to identify the machine parameter of the first type machine, to obtain the first time data of the first type machine.

Specifically, after the matching unit 22 obtains the serial number of the first type machine producing the abnormal sampled product and the corresponding machine parameter, the identifying unit 23 identifies the machine parameter, that is, the real-time operating parameter of the first type machine is compared with the standard operating parameter, to obtain a time interval in which the parameter is abnormal that the real-time operating parameter is not consistent with the standard operating parameter, that is, the identifying unit 23 obtains the first time data of the first type machine.

It should be understood that, the standard operating parameter may be a parameter change interval. When the actual operating parameter fails to fall within the parameter change interval, the real-time operating parameter is not consistent with the standard operating parameter.

In the technical solutions of the present disclosure, the production management system 100 converts the process of manual matching and identification into the process of system matching and identification during the process of obtaining the first time data of the first type machine, which not only saves the cost of manpower resources, effectively improves the efficiency of the matching and identification process, but also reduces the adverse impact to the process of withholding the first type product due to man-made causes, so that the withholding process of the first type products is further simplified and facilitated.

Figure 7:
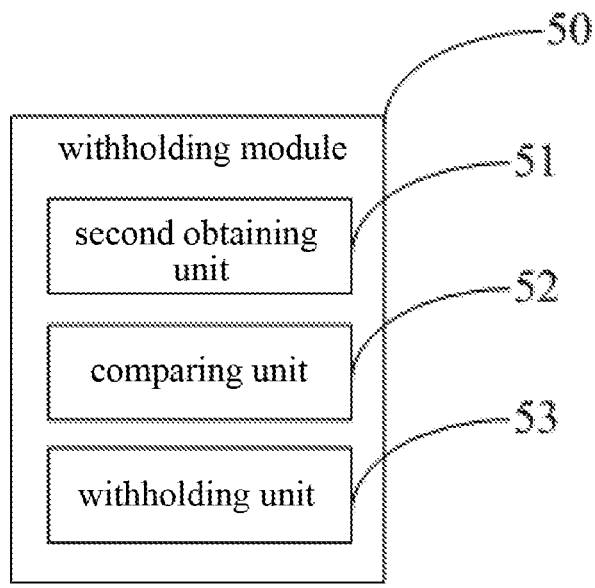
FIG. 7 is a block diagram of the withholding module as shown in FIG. 5.

Referring to FIG. 7, FIG. 7 is a block diagram of the retaining module, in this embodiment, the first retaining module 50 includes:

a second acquiring unit 51, configured to acquire a site capable to withhold product;

a comparing unit 52, configured to compare the current distribution site of the first type product with the site capable to withhold product; and a withholding unit 53, configured to withhold the first type product at the current distribution site, when the current distribution site of the first type product is included in the collection of the site capable to withhold product.

The withholding unit 53 is further configured to transfer the first type product to a nearest site capable to withhold product to withhold the first type product, when the current distribution site of the first type product is not included in the collection of the site capable to withhold product.

It should be understood that, in the actual withholding process, due to various reasons, such as: personnel, vehicles, road conditions, transportation conditions, and so on, not every current distribution site could directly perform withholding process. For this case, after obtaining the current distribution site of the first type product, the site capable to withhold product input by the operator could be obtained through the user interaction interface.

After the second acquiring unit 51 obtains the sites capable to withhold product, the comparing unit 52 compares the current distribution sites of the first type products with the sites capable to withhold product. For this case, there are two site types in the current distribution sites, one site type exists in the sites capable to withhold product (namely, the current distribution site which is included in the collection of the sites capable to withhold product), and the other site type does not exist in the sites capable to withhold product (namely, the current distribution site which is not included in the collection of the sites capable to withhold product).

For the current distribution sites which exist in the sites capable to withhold product, withholding unit 53 directly withholds the first type products in these sites. And for the current distribution sites which do not exist in the sites capable to withhold product, the withholding unit 53 transfers or postpones the first type products in these sites to the nearest site capable to withhold product for withholding.

For example, the current distribution sites of the first type products are A, C and E; the sites capable to withhold product are A, C and F.

For site A in the current distribution sites, it is included in the collection of the sites capable to withhold product, the first type products in the site A are directly withheld at the site A;

for site C in the current distribution sites, it is also included in the collection of the sites capable to withhold product, the first type products in the site C are directly withheld at the site C;

for site E in the current distribution sites, it is not included in the collection of the sites capable to withhold product, the first type products in the site E are transferred or postponed to the site capable to withhold product F for withholding.

In this way, it is possible to intelligently perform the withholding process according to the actual situation, which not only effectively improves the efficiency of the withholding process, but also effectively guarantees the timeliness of the withholding process.

Figure 8:
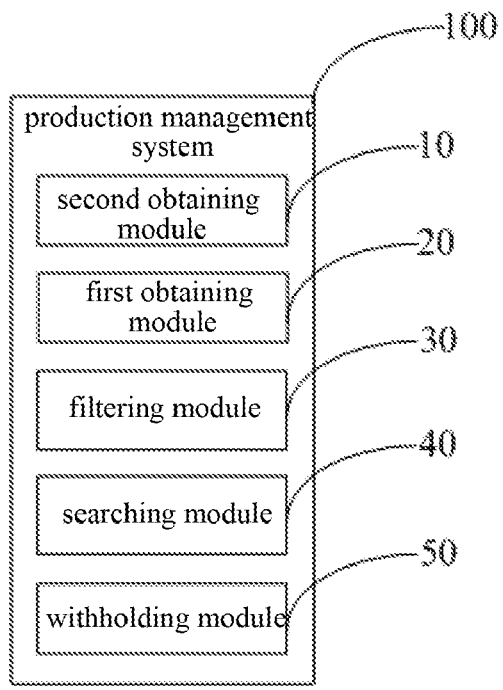
FIG. 8 is a block diagram of the production management system of another embodiment according to the present disclosure.

Another embodiment of the production management system 100 according to the present disclosure is provided based on the above embodiments. Referring to FIG. 8, in this embodiment, the production management system 100 further includes a second acquiring module 10, the second acquiring module 10 is configured to acquire the production information of product.

It should be noted that, in actual production, the production information of every product (including: serial number of product, barcode, two-dimensional code, production start time, production stop time, production site, serial number of production machine, machine parameter, or current distribution site, and so on) is monitored, recorded, and stored, so that the production information of all of the products forms a systematic and orderly information library, namely the production information library, thereby facilitating the process of searching, filtering, comparing, matching, and so on.

The following is a description of the above production management system 100 taking the display panel as an example. Specifically:

When a random inspection is performed on the display panels during the production process, and an abnormal product is detected in the sampled display panels, the production management system 100 acquires the serial number of the abnormal display panel (specifically, acquiring the serial number input by the manufacturer through the user interaction interface, or acquiring the serial number by scanning the two-dimensional code or the barcode), and the production management system 100, according to the serial number of the abnormal display panel, acquires the relevant machine producing the abnormal display panel and the parameter information thereof by matching in the production information library. In some embodiments, the abnormal display panel is a defective product that appears in the process. And the parameter information of the relevant machine is identified: comparing the real-time operating parameter of the relevant machine with the corresponding standard operating parameter, to obtain a time interval in which the parameter is abnormal that the real-time operating parameter is not consistent with the standard operating parameter, namely the abnormal time interval of the relevant machine.

Next, the production management system 100, according to the abnormal time interval of the relevant machine, filters to obtain the serial numbers of all the abnormal display panels produced by the relevant machine during the corresponding abnormal time interval in the production information library. Then, according to the serial numbers of all the abnormal display panels, the current distribution sites of all the abnormal display panels are obtained by searching in the production information library.

Finally, the production management system 100, according to the current distribution sites of all the abnormal display panels, withholds all the abnormal display panels in corresponding sites: blocking all the abnormal display panels, not allowing this part of the display panels to be transported or sold, so as to prevent the circulation of the abnormal display panels.

Additionally, it should be understood that, the standard operating parameter of the machine is generally in a range. When the real-time operating parameter of the machine falls within the range, the machine may produce qualified products; when the real-time operating parameter of the machine is below the range, the machine may produce unqualified products. And when the real-time operating parameter of the machine is above the range, the machine may produce higher quality products. Therefore, the comparison of the real-time operating parameter of the machine with a higher range, could become an acquisition condition of the numbers of higher quality products, so as to find this part of the higher quality products.

Additionally, the production management method according to the present disclosure is also applied to the production process of LCD (Liquid Crystal Display) display panels, OLED (Organic Light Emitting Diode) display panels, QLED (Quantum Dot Light Emitting Diodes) display panels, curved surface display panels and other display panels, making the withholding process of the first type products (namely the qualified products) simpler and more convenient, saving human resource costs, and reducing the adverse effects of human problems on the withholding process of the first type products (namely the qualified products).

In addition, each functional unit or module in each embodiment according to the present disclosure may be integrated into one processing unit, or each unit may physically exist and separate from each other, or two or more units may be integrated into one unit. The above integrated unit may be implemented by means of hardware, or by means of hardware plus a software functional unit.

The above integrated unit implemented by means of a software functional unit or module may be stored in a computer-readable storage medium. The above soft functional unit is stored in the storage medium, including a plurality of instructions to allow a processor of a computer device (which may be a personal computer, a server, or a network device, and so on) to perform some of the steps of the methods described in each embodiments according to the present disclosure. And the above-mentioned storage medium includes various medium that could store program code, such as USB disk, portable hard disk, Read-Only Memory (ROM), Random Access Memory (RAM), disk or compact disk.

The foregoing description merely portrays some illustrative embodiments in accordance with the disclosure and therefore is not intended to limit the patentable scope of the disclosure. Any equivalent structure or flow transformations that are made taking advantage of the specification and accompanying drawings of the disclosure and any direct or indirect applications thereof in other related technical fields shall all fall in the scope of protection of the disclosure.

What is claimed is:

1. A production management method, comprising:
    acquiring a first time data of a first type machine;
    filtering to obtain a production data of a first type product produced by the first type machine under the first time data based on a preset algorithm;
    searching production information of all products to obtain a current distribution site of the first type product, according to the production data of the first type product; and
    withholding the first type product in the current distribution site;
    wherein the operation of withholding the first type product in the current distribution site comprises:
    acquiring a site capable to withhold product;
    comparing the current distribution site of the first type product with the site capable to withhold product, whether the current distribution site to perform withholding process depending on personnel, vehicles, road conditions, transportation conditions;
    withholding the first type product at the current distribution site, in response to a determination that the current distribution site of the first type product is comprised in the collection of the site capable to withhold product; and
    transferring the first type product to a nearest site capable to withhold product to withhold the first type product, in response to a determination that the current distribution site of the first type product is not comprised in the collection of the site capable to withhold product.

2. The production management method of claim 1, wherein, before the operation of acquiring a first time data of a first type machine, the production management method further comprises:
    acquiring production information of a product.

3. The production management method of claim 2, wherein, the production information comprises: a serial number of the product, a barcode, a two-dimensional code, a production start time, a production stop time, a production site, a serial number of a production machine, a machine parameter, or a current distribution site.

4. The production management method of claim 3, wherein, the production information is monitored, recorded, and stored, to form a production information library with the production information of all of the products.

5. The production management method of claim 1, wherein, the operation of acquiring a first time data of a first type machine comprises:
    acquiring a serial number of an abnormal sampled product;
    matching to obtain a serial number of the first type machine that produces the abnormal sampled product and a corresponding machine parameter, according to the serial number of the abnormal sampled product; and
    identifying the machine parameter of the first type machine, to obtain the first time data of the first type machine.

6. The production management method of claim 1, wherein, the preset algorithm comprises:
    comparing whether a production start time of each product produced by the first type machine is later than a start value of the first time data; and
    comparing whether a production stop time of the product is earlier than a stop value of the first time data.

7. The production management method of claim 1, wherein, the operation of withholding the first type product in the current distribution site comprises:
    classifying the production data of the first type products in the same current distribution site into one type, to obtain a production data list of the first type products in each current distribution site; and
    sending the production data lists of the first type products corresponding to different current distribution sites to the systems corresponding to the sites, to allow the corresponding systems to block all the first type products in the site thereof according to the production data of the first type products.

8. A production management system, comprising:
    a first acquiring module, configured to acquire a first time data of a first type machine;
    a filtering module, configured to filter to obtain a production data of a first type product produced by the first type machine under the first time data based on a preset algorithm;
    a searching module, configured to search production information of all products to obtain a current distribution site of the first type product, according to the production data of the first type product; and
    a withholding module, configured to withhold the first type product in the current distribution site;
    wherein the withholding module comprises:
    an acquiring unit, configured to acquire a site capable to withhold product;
    a comparing unit, configured to compare the current distribution site of the first type product with the site capable to withhold product, whether the current distribution site to perform withholding process depending on personnel, vehicles, road conditions, transportation conditions; and
    a withholding unit, configured to withhold the first type product at the current distribution site, when the current distribution site of the first type product is comprised in the collection of the site capable to withhold product, and configured to transfer the first type product to a nearest site capable to withhold product to withhold the first type product, in response to a determination that the current distribution site of the first type product is not comprised in the collection of the site capable to withhold product.

9. The production management system of claim 8, wherein, the first acquiring module is further configured to acquire production information of a product.

10. The production management system of claim 9, wherein, the production information comprises: a serial number of the product, a barcode, a two-dimensional code, a production start time, a production stop time, a production site, a serial number of a production machine, a machine parameter, or a current distribution site.

11. The production management system of claim 9, wherein, the production information is monitored, recorded, and stored, to form a production information library with the production information of all of the products.

12. The production management system of claim 8, wherein, the first obtaining module comprises:
    a first acquiring unit, configured to acquire a serial number of an abnormal sampled product;

a matching unit, configured to match to obtain a serial number of the first type machine that produces the abnormal sampled product and a corresponding machine parameter, according to the serial number of the abnormal sampled product; and an identifying unit, configured to identify the machine parameter of the first type machine, to obtain the first time data of the first type machine.

13. The production management system of claim 8, wherein, the preset algorithm comprises:

comparing whether a production start time of each product produced by the first type machine is later than a start value of the first time data; and comparing whether a production stop time of the product is earlier than a stop value of the first time data.

14. The production management system of claim 13, wherein, when the two comparison results of the same product by the filtering module are both yes, the filtering module marks and feeds back the production data of the product.

15. The production management system of claim 14, wherein, the filtering module organizes, sorts the production data of all the products satisfying a requirement, and saves or presents the production data in the form of a list.

16. A production management system, comprising:

a first acquiring module, configured to acquire a first time data of a first type machine;

a filtering module, configured to filter to obtain a production data of a first type product produced by the first type machine under the first time data based on a preset algorithm;

a searching module, configured to search to obtain a current distribution site of the first type product, according to the production data of the first type product; and a withholding module, configured to withhold the first type product in the current distribution site;

wherein, the first acquiring module comprises:

a first acquiring unit, configured to acquire a serial number of an abnormal sampled product;

a matching unit, configured to match to obtain a serial number of the first type machine that produces the abnormal sampled product and corresponding machine parameter, according to the serial number of the abnormal sampled product; and an identifying unit, configured to identify the machine parameter of the first type machine, to obtain the first time data of the first type machine;

wherein, the withholding module comprises:

a second acquiring unit, configured to acquire a site capable to withhold product;

a comparing unit, configured to compare the current distribution site of the first type product with the site capable to withhold product, whether the current distribution site to perform withholding process depending on personnel, vehicles, road conditions, transportation conditions; and a withholding unit, configured to withhold the first type product at the current distribution site, when the current distribution site of the first type product is comprised in the collection of the site capable to withhold product, and configured to transfer the first type product to a nearest site capable to withhold product to withhold the first type product, in response to a determination that the current distribution site of the first type product is not comprised in the collection of the site capable to withhold product.

* * * * *